United States Patent
Feng et al.

(10) Patent No.: US 8,741,226 B2
(45) Date of Patent: *Jun. 3, 2014

(54) REDUCTION-OXIDATION FURNACE FOR MAKING PHOSPHORUS BY THERMAL PROCESS

(75) Inventors: Xiaomei Feng, Haidian District (CN); Jin Li, Shifang (CN); Dong Li, Haidian District (CN); Guangming Li, Shifang (CN); Zhenmin Zhang, Haidian District (CN); Jiacai Wang, Shifang (CN); Jian Zou, Shifang (CN); Yongqiang Ma, Shifang (CN); Jun Hou, Shifang (CN)

(73) Assignees: China Enfi Engineering Corp., Haidian District, Beijing (CN); Sichuan Chuanheng Chemical Corporation, Shifang, Sichuan (CN)

( * ) Notice: Subject to any disclaimer, the term of this patent is extended or adjusted under 35 U.S.C. 154(b) by 231 days.

This patent is subject to a terminal disclaimer.

(21) Appl. No.: 13/321,975

(22) PCT Filed: May 27, 2010

(86) PCT No.: PCT/CN2010/073308
§ 371 (c)(1),
(2), (4) Date: Feb. 15, 2012

(87) PCT Pub. No.: WO2010/148899
PCT Pub. Date: Dec. 29, 2010

(65) Prior Publication Data
US 2012/0134885 A1    May 31, 2012

(30) Foreign Application Priority Data

Jun. 25, 2009 (CN) .......................... 2009 1 0087961
Jun. 25, 2009 (CN) ...................... 2009 2 0109616 U

(51) Int. Cl.
*B01J 19/00* (2006.01)
*C01B 25/00* (2006.01)

(52) U.S. Cl.
USPC ........... 422/198; 422/187; 422/129; 422/232; 422/240; 423/322; 423/323

(58) Field of Classification Search
USPC .......... 422/198, 187, 129, 232, 240; 423/322, 423/323
See application file for complete search history.

(56) References Cited

U.S. PATENT DOCUMENTS 3,723,608 A    3/1973    Meurer et al.
4,158,699 A    6/1979    Volfkovich et al.

FOREIGN PATENT DOCUMENTS

| CN | 1160018 A | 9/1997 |
|---|---|---|
| CN | 1172766 A | 2/1998 |
| CN | 101172589 A | 5/2008 |
| CN | 101650120 A | 2/2010 |
| CN | 101650125 A | 2/2010 |
| CN | 201440036 U | 4/2010 |

OTHER PUBLICATIONS

International Search Report for corresponding International Patent Application No. PCT/CN2010/073308 mailed Sep. 2, 2010.

*Primary Examiner* — Lessanework Seifu
(74) *Attorney, Agent, or Firm* — Merchant & Gould P.C.

(57) ABSTRACT

The present invention discloses a reduction-oxidation furnace for thermally refining phosphorus. The reduction-oxidation furnace comprises a furnace body and a blow gun, wherein the furnace body has a slag outlet, a fume outlet, and a melt inlet for feeding melts formed by melting rock phosphate into the furnace body and wherein the blow gun has an end inserted into the furnace body. The content of impurities in fumes containing phosphorus pentaoxide is low, the phosphorus pentaoxide can be easily extracted with a high purity of the phosphorus pentaoxide and at low cost by means of the reduction-oxidation furnace for thermally refining phosphorus according to the present invention.

11 Claims, 3 Drawing Sheets

REDUCTION-OXIDATION FURNACE FOR MAKING PHOSPHORUS BY THERMAL PROCESS

This application is a National Stage Application of PCT/CN2010/073308, filed 27 May 2010, which claims benefit of Ser. No. 200910087961.X, filed 25 Jun. 2009 in China and Ser. No. 200920109616.7, filed 25 Jun. 2009 in China and which applications are incorporated herein by reference. To the extent appropriate, a claim of priority is made to each of the above disclosed applications.

BACKGROUND OF THE INVENTION

1. Field of the Invention

The present invention pertains to a field of inorganic chemical industry, and particularly to a reduction-oxidation furnace for thermally refining phosphorus.

2. Description of the Related Art

Methods for refining phosphorus from rock phosphate mainly comprise a wet refining method (wet process) in which the rock phosphate reacts with an inorganic acid (generally with sulphuric acid) to produce rough phosphoric acid after phosphogypsum and impurities are separated, and a thermal refining method (thermal process), such as using an electric furnace or a kiln, in which gaseous elemental phosphorus is reduced by heating the rock phosphate and then is oxidized and hydrated to produce phosphoric acid.

The wet refining method has an advantage of low energy consumption. However, phosphoric acid produced by the wet refining method is not sufficient in purity and should be further purified. When a thermal refining method, such as using an electrical furnace, is employed, it is difficult to melt the rock phosphate, consumption of electric energy is large, and high grade rock phosphate is required, and low grade rock phosphate can not be processed. When a kiln, that is a hot method, is used, its reaction rate is low and a ring tends to be formed so that utilization ratio of the kiln is reduced and it is difficult to achieve a production at scale. Furthermore, in a conventional thermal refining method, gaseous phosphorus pentaoxide produced by oxidization is mixed in fumes having a complex composition so that it is difficult to separate the phosphorus pentaoxide from the fumes, purity of the phosphorus pentaoxide is decreased, and cost is high.

Chinese patent publication CN1160018A disclosed a process for producing phosphoric acid and phosphate by a thermal refining method. Injection metallurgy, melting reduction, and preparation of phosphoric acid by means of oxidative combustion of coal gas and elemental phosphorus are combined in the process. In other words, coal, oxygen and rock phosphate are injected. Reduction of the elemental phosphorus is performed in a melted state and oxidative combustion of the elemental phosphorus is performed in the same reactor so that phosphoric acid or phosphate is produced. However, the process has the following disadvantages.

Since the melting, reduction, and oxidization of the rock phosphate are simultaneously performed in the same reactor, fumes generated during the melting and fumes generated during the reduction and oxidization are mixed together so that impurities in the fumes are large. Therefore, it is difficult to extract phosphorus pentaoxide and purity of the phosphorus pentaoxide is low.

Since the rock phosphate is injected into a reduction-oxidation furnace body through a top blow gun, requirement for particle size of the rock phosphate is high, and cost is increased.

Since the top blow gun is immerged below a surface of liquid slag, it severely consumes itself due to hot corrosion and a top blowing pressure must increase. Moreover, water cooling is not suitable for the top blow gun immerged below the surface of the liquid slag. Otherwise, once water leaks, it is mixed into the slags. Explosion easily occurs to cause safety misadventure.

A bottom blow gun is disposed at a bottom of the reduction-oxidation furnace to inject coal powders and oxygen into melts. Therefore, when the bottom blow gun is replaced, operation of replacing the bottom blow gun can be performed only after stopping the furnace to empty the melts.

Since a flux inlet is disposed at a top of the reduction-oxidation furnace, it needs to be constantly opened and sealed in use. Its operation will be complex and it is difficult to seal the flux inlet.

SUMMARY OF THE INVENTION

Accordingly, the present invention is intended to overcome at least one of the above technical problems of the prior art. Therefore, one object of the present invention is to provide a reduction-oxidation furnace for thermally refining phosphorus. The content of impurities in fumes containing gaseous phosphorus pentaoxide will be reduced and the phosphorus pentaoxide can be easily extracted with a high purity of the phosphorus pentaoxide and at low cost by means of the reduction-oxidation furnace for thermally refining phosphorus.

The reduction-oxidation furnace for thermally refining phosphorus according to the present invention comprises a furnace body and a blow gun, wherein the furnace body has a slag outlet, a fume outlet, and a melt inlet for feeding melts formed by melting rock phosphate into the furnace body and wherein the blow gun has an end inserted into the furnace body.

In the reduction-oxidation furnace for thermally refining phosphorus according to the present invention, the melts formed by the melted rock phosphate are fed into the furnace body. In other words, the rock phosphate is not melted in the furnace body anymore and the melts formed by the melt rock phosphate are directly reduced and oxidized. Therefore, the fumes generated by melting the rock phosphate and the fumes generated by the reduction and oxidization are not mixed together so that the content of impurities in the fumes containing gaseous phosphorus pentaoxide which is produced after oxidization is low, and the phosphorus pentaoxide can be easily extracted with a high purity of the phosphorus pentaoxide and at low cost. The present invention solves the problem that it is difficult to extract phosphorus pentaoxide with a high purity of the phosphorus pentaoxide and at low cost because fumes generated from melting and fumes generated from reduction and oxidization are mixed together when melting, reduction and oxidization reaction are performed in the same furnace body.

Furthermore, because the rock phosphate is melted outside the furnace in advance and then fed into the furnace body through the melt inlet, it is not necessary to inject the rock phosphate into the furnace body through a blow gun. Therefore, the requirement for particle size of the rock phosphate is low and cost decreases.

The reduction-oxidation furnace for thermally refining phosphorus according to the present invention further comprises the following additional technical features.

The blow gun comprises a top blow gun and a side blow gun. The top blow gun has a lower end inserted into the furnace body from a top of the furnace body and always located above the surface of liquid slag within the furnace body, and the side blow gun has an end inserted into the furnace body from a side of the furnace body and located below the melt inlet.

The top blow gun is inserted into the furnace body from the top of the furnace body and always located above the surface of the liquid slag within the furnace body. In other words, the lower end of the top blow gun is not immerged below the surface of the liquid slag within the furnace body, and therefore the top blow gun is also referred to as a non-immerged top blow gun. As a result, the top blow gun will not consume itself due to hot corrosion, the life time of the top blow gun can be prolonged, and cost is lowered. In addition, the top blow gun can also be cooled by water and does not cause explosion which easily occurs if an immerged top blow gun is cooled with water. Not only cooling efficiency is high, but safety is also improved.

The slag outlet comprises an upper slag outlet and a lower slag outlet located below the upper slag outlet, wherein the lower slag outlet is lower than the end of the side blow gun which is inserted into the furnace body.

The lower slag outlet is disposed below the end of the side blow gun which is inserted into the furnace body. Therefore, when it is necessary to replace the side blow gun, the side blow gun can be replaced, without stopping the furnace, by discharging the slags through the lower slag outlet and thus lowering the surface of the liquid slag within the furnace body below the end of the side blow gun inserted into the furnace body. As a result, efficiency is improved and cost decreases.

A position limiting member is disposed over the furnace body to limit a depth to which the lower end of the top blow gun is inserted into the furnace body.

The depth to which the top blow gun is inserted downwards can be limited by means of the position limiting member to prevent the top blow gun from being inserted into the surface of the liquid slag within the furnace body.

The melt inlet is located below the surface of the liquid slag within the furnace body. Therefore, the melt inlet can always be sealed by means of the melt (and/or the slag) within the furnace body. Not only is the seal reliable, but cost is also low.

A projection is disposed on an outer side wall of the furnace body. A recess is disposed on an upper surface of the projection. The melts enter the melt inlet through the recess. Therefore, the melts formed by melting the rock phosphate can be temporarily stored in the recess and conveniently discharged into the furnace body.

The melt inlet is in communication with the recess through an inclined channel. Therefore, a height of the melt inlet can lower and is not affected by a position of the recess. As a result, the melt inlet is better sealed and the surface of the liquid slag is avoided from being lower than the melt inlet.

A temperature maintaining burner is disposed over the recess. A temperature of the melts fed into the recess from outside of the furnace body can be maintained and energy supplied into and consumed within the furnace body is decreased by means of the temperature maintaining burner.

The melt inlet is in communication with a trough through which the melts is fed into the furnace body via the melt inlet. It has the advantage of simplifying structure to guide the melts by using the trough.

The furnace body is provided with a ferrophosphorus outlet located below the surface of the liquid slag. The ferrophosphorus positioned beneath the slags at the bottom of the furnace body can be discharged through the ferrophosphorus outlet. The discharged ferrophosphorus can be recovered Additional aspects and/or advantages of the invention will be set forth in part in the description which follows and, in part, will be obvious from the following description, or may be learned by practice of the invention.

BRIEF DESCRIPTION OF THE DRAWINGS

The above and/or other aspects and advantages of the present invention will become apparent and more readily appreciated from the following description of the exemplary embodiments, taken in conjunction with the accompanying drawings, in which.

DETAILED DESCRIPTION OF THE EMBODIMENTS

Figure 1:
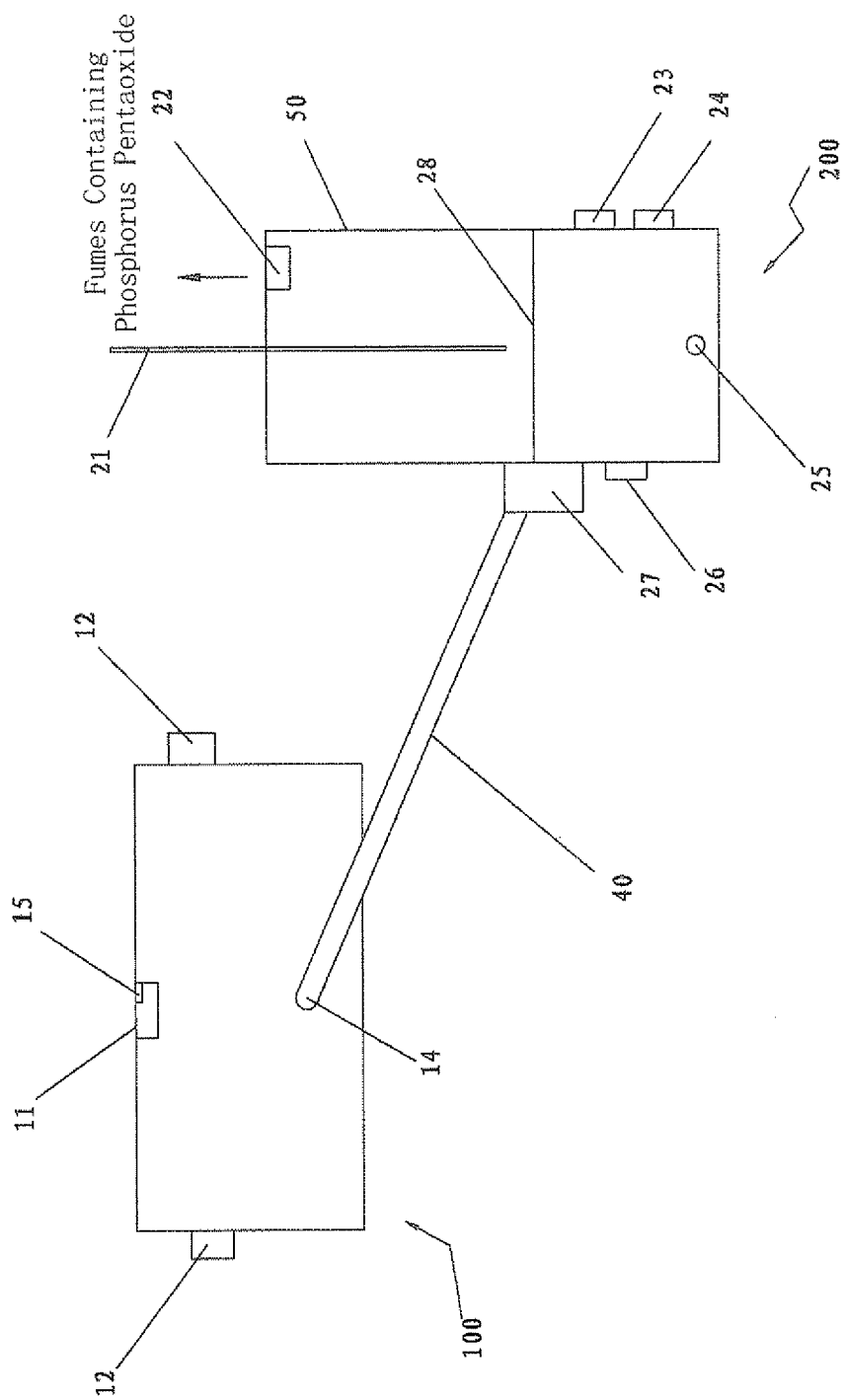
FIG. 1 is a schematic view of a reduction-oxidation furnace for thermally refining phosphorus according to an embodiment of the present invention, in which a melting furnace communicated with the reduction-oxidation furnace to melt rock phosphate into melts, is shown.

Reference will now be made in detail to the embodiments of the present invention, examples of which are illustrated in the accompanying drawings, wherein like reference numerals refer to like elements throughout. The embodiments are described below so as to explain the present invention by referring to the figures and the present invention should not be construed as being limited to the embodiments set forth herein.

Figure 2:
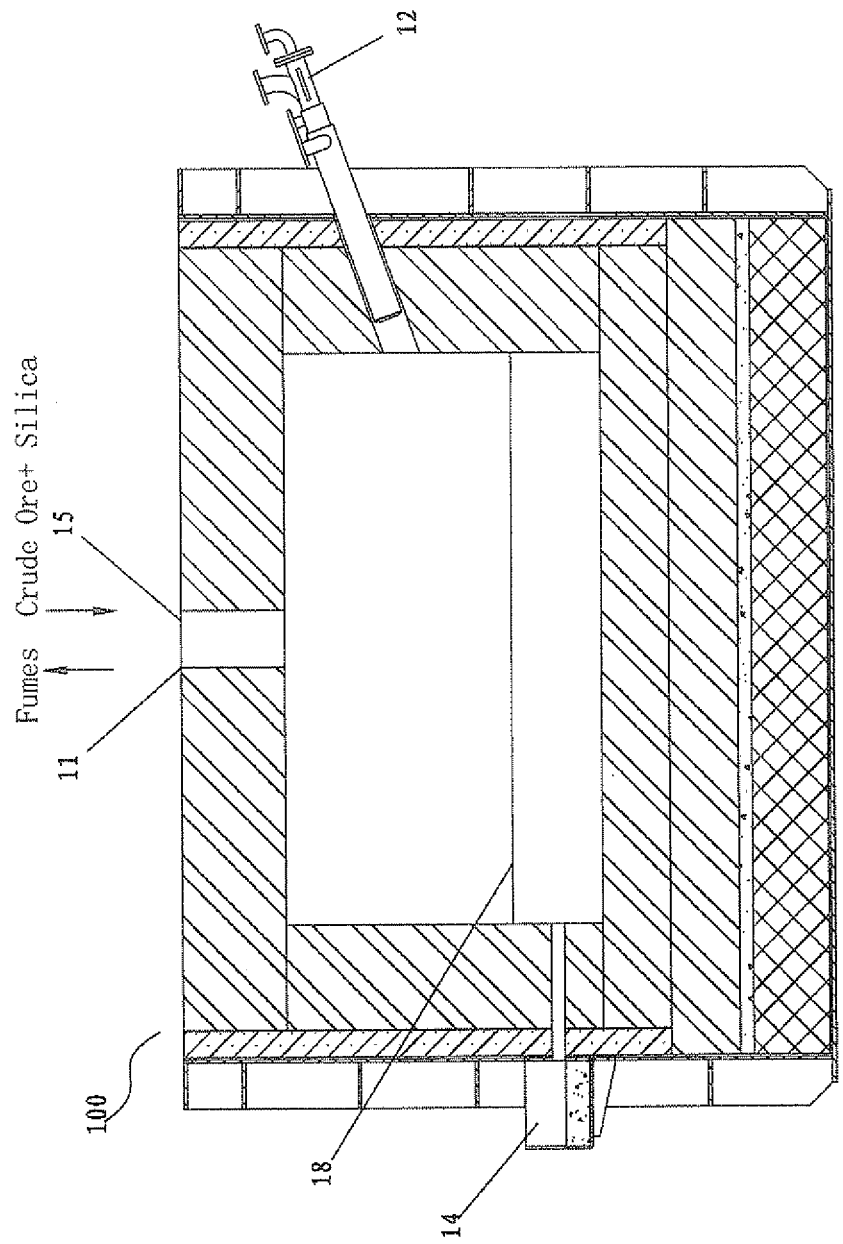
FIG. 2 is a schematic cross sectional view of an example of the melting furnace shown in FIG. 1.

FIG. 1 is a schematic view of a reduction-oxidation furnace for thermally refining phosphorus according to an embodiment of the present invention, in which a melting furnace communicated with the reduction-oxidation furnace to melt rock phosphate into melts, is shown; FIG. 2 is a schematic cross sectional view of an example of the melting furnace shown in FIG. 1; and FIG. 3 is a schematic cross sectional view of the reduction-oxidation furnace for thermally refining phosphorus shown in FIG. 1.

Figure 3:
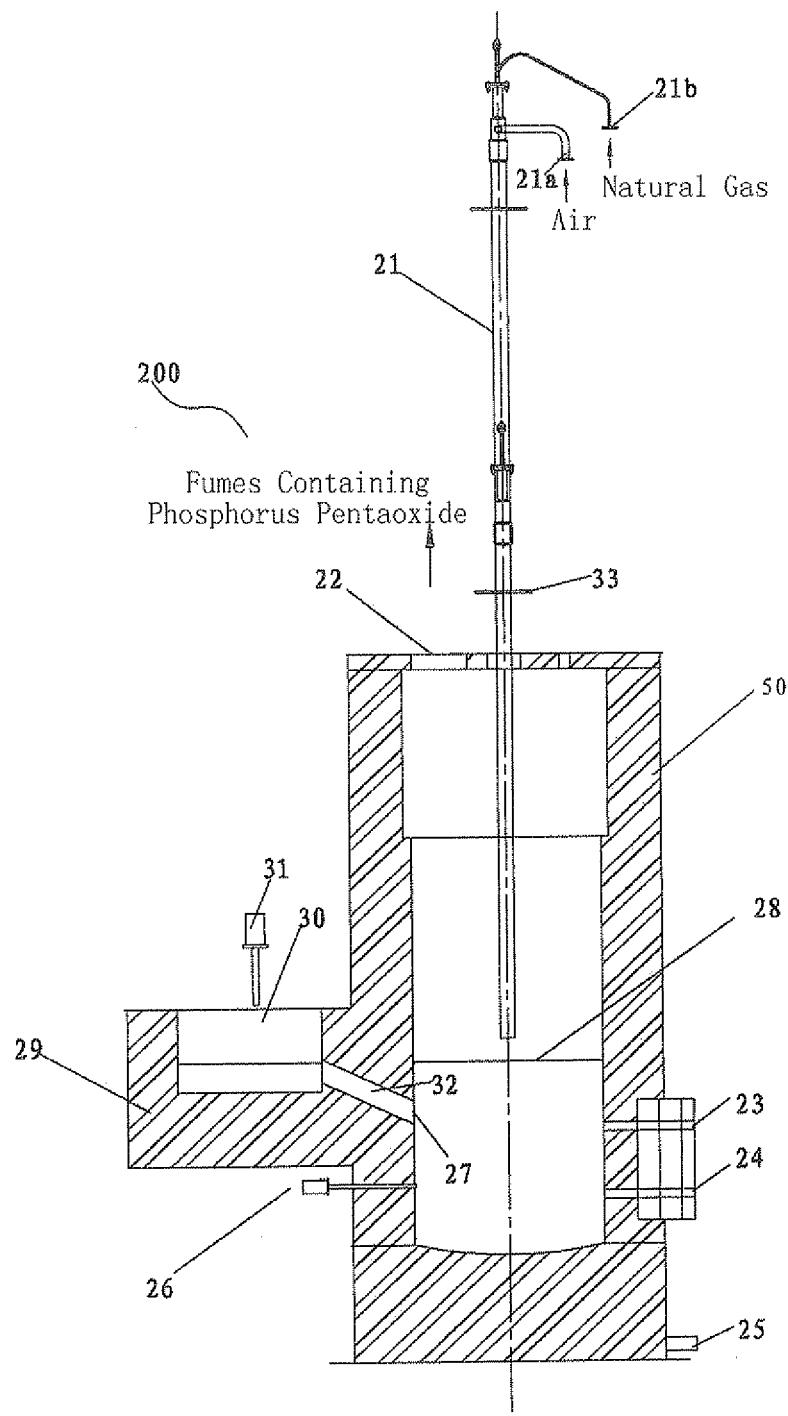
FIG. 3 is a schematic cross sectional view of the reduction-oxidation furnace for thermally refining phosphorus shown in FIG. 1.

As shown in FIGS. 1-3, the reduction-oxidation furnace 200 for thermally refining phosphorus according to an embodiment of the present invention comprises a furnace body 50 and a blow gun. The furnace body 50 defines a cavity (a furnace chamber) therein and has a slag outlet, a fume outlet 22 and a melt inlet 27 for feeding melted rock phosphate into the furnace body 50. The blow gun has an end inserted into the furnace body 50.

As shown in FIGS. 1 and 2, a melting furnace 100 is used to melt the rock phosphate into melts in advance. Then, the melts are fed into the reduction-oxidation furnace 200 for reduction and oxidation reaction, so that gaseous phosphorus pentaoxide is extracted from fumes generated within the reduction-oxidation furnace 200.

Therefore, only the melts formed by the melted rock phosphate are subjected to reduction and oxidation reaction in the reduction-oxidation furnace 200 according to the present invention. Fumes generated during the melting of the rock phosphate and fumes generated during the reduction and oxidization reaction of the melts are not mixed with each other so that the content of impurities in the fumes within the reduction-oxidation furnace 200 is lower, the gaseous phosphorus pentaoxide can be easily extracted with a high purity and at low cost.

The melting furnace 100 for supplying the melt into the reduction-oxidation furnace 200 of the present invention will be described briefly below. It is to be noted that the melting furnace 100 is not limited to the structure to be described and shown. The melting furnace may comprise any melting devices which can melt rock phosphate into melts. Furthermore, the melting furnace 100 is not a component constituting the present invention. The following description is provided only for better understanding of the present invention and should not be construed as being limited to the present invention.

In an example, as shown in FIGS. 1 and 2, the melting furnace 100 has a feed port 11 for feeding rock phosphate into the melting furnace 100, and a melt outlet 14 for discharging melts from the melting furnace 100. In order to lower the melting temperature of the rock phosphate, silica may also be fed into the melting furnace 100. For example, the rock phosphate and the silica are simultaneously fed into the melting furnace 100 through the feed port 11.

As shown in FIGS. 1 and 2, the melting furnace 100 may further be provided with an oxygen and natural gas nozzle 12. Two oxygen and natural gas nozzles 12 are shown in FIG. 1, but the present invention is not limited thereto. The oxygen and natural gas nozzle 12 is used to inject oxygen and natural gas into the melting furnace 100 to melt the rock phosphate. Furthermore, as shown in FIG. 2, a cyclone heater 15 may be disposed at the feed port 11 of the melting furnace 100 to preheat the rock phosphate and the silica fed into the melting furnace 100.

Fumes generated in the melting furnace 100 may be discharged through the feed port 11. Of course, the melting furnace 100 may be provided with a separate fume discharging exit for discharging the fumes.

The melt inlet 27 of the furnace body 50 and the melt outlet 14 of the melting furnace 100 are in communication with each other to feed the melts discharged from the melting furnace 100 into the furnace body 50.

It is to be noted that the term "in communication with each other" of the melt inlet 27 of the furnace body 50 and the melt outlet 14 of the melting furnace 100 should be interpreted broadly. For example, the melt inlet 27 and the melt outlet 14 of the melting furnace 100 may be communicated with each other through a trough 40 to be described later, a conduit, or by locating the melt inlet 27 beneath the melt outlet 14 of the melting furnace 100 so that the melts discharged from the melt outlet 14 of the melting furnace 100 can directly flow to the melt inlet 27.

The slag outlet of the furnace body 50 is used to discharge slags from the furnace body 50. Reduced elemental phosphorus is oxidized to fumes of phosphorus pentaoxide. The fumes of phosphorus pentaoxide are discharged through the fume outlet 22 along with other fumes within the furnace body 50 and then phosphorus pentaoxide can be separated from the fumes to produce acids.

As shown in FIGS. 1 and 3, in accordance with an example of the present invention, the blow gun of the reduction-oxidation furnace 200 comprises a top blow gun 21 and a side blow gun 26. The top blow gun 21 has a lower end inserted into the furnace body 50 from a top of the furnace body 50 and always located above the surface 28 of the liquid slag within the furnace body 50. The top blow gun 21 is used to inject air into the furnace body 50 to oxidize the phosphorus reduced from the melts, thereby producing the phosphorus pentaoxide. As shown in FIG. 3, an air supplying pipe 21a is disposed at the upper part of the top blow gun 21. Furthermore, the top blow gun 21 may also simultaneously inject the air and natural gas into the furnace body 50. The natural gas is burned for maintaining a temperature. A natural gas supplying pipe 21b is disposed at the upper part of the top blow gun 21. The lower end of the top blow gun 21 is not penetrated into the slags (and/or the melts). In other words, the top blow gun 21 is a non-immerged top blow gun. As a result, the top blow gun 21 will not consume itself, life time of the top blow gun is prolonged, the injection port of the top blow gun doe not easily clog and cost and energy consumption are reduced. In addition, the top blow gun can be cooled by means of water so as to improve cooling efficiency. Furthermore, explosion which occurs due to water leakage when an immerged top blow gun is cooled with water will not occur and thus safety is improved.

In order to prevent the top blow gun 21 from being accidentally immerged into the slags within the furnace body 50, a position limiting member 33 is disposed over the furnace body 50. The position limiting member 33 can limit a maximal depth to which the top blow gun 21 is inserted into the furnace body 50, and thus prevent the top blow gun 21 from being immerged into the melts within the furnace body 50. The position limiting member 33 may have any appropriate structure. For example, the position limiting member 33 may comprise a position limiting plate mounted to the top blow gun 21 and a position limiting piece fixed to the top of the furnace body 50.

The side blow gun 26 has an end inserted into the furnace body 50 from a side of the furnace body 50 and located below the melt inlet 27. The side blow gun 26 injects oxygen and powder coal or heavy oil into the furnace body 50. The powder coal or heavy oil is burned to provide heat necessary for the reduction reaction. Moreover, the powder coal or heavy oil provides reducer of carbon necessary for the reduction reaction.

The slag outlet of the furnace body 50 comprises an upper slag outlet 23 and a lower slag outlet 24 located below the upper slag outlet. The lower slag outlet 24 is lower than the end of the side blow gun 26 which is inserted into the furnace body 50. Therefore, the surface of the liquid slag within the furnace body 50 is below the side blow gun 26. The side blow gun 26 can be conveniently replaced without completely emptying the slags and/or the melts out of the furnace body 50 and stopping the furnace, and hence its efficiency is improved.

As shown in FIG. 3, the melt inlet 27 is disposed on the side wall of the furnace body 50 and located below the surface 28 of the liquid slag within the furnace body 50. Therefore, the slags and/or the melts within the furnace body 50 can seal the melt inlet 27 in a form of liquid to prevent the fumes within the furnace body 50 from leaking out from the melt inlet 27.

As shown in FIGS. 1 and 3, in accordance with an example of the present invention, a projection 29 is disposed on an outer side wall of the furnace body 50. A recess 30 is disposed on the upper surface of the projection 29. The recess 30 is in communication with the melt outlet 14 and the melt inlet 27, respectively.

For example, the recess 30 is in communication with the melt outlet 14 of the melting furnace 100 through the trough 40. The melts discharged from the melting furnace 100 through the melt outlet 14 are fed into the recess 30 via the trough 40, and then flows into the furnace body 50 through the melt inlet 27. In order to maintain a temperature of the melts within the recess 30, a temperature maintaining burner 31 is disposed over the recess 30. The temperature maintaining burner 31 may eject oxygen and natural gas which burn to maintain the temperature of the melts within the recess 30, for example.

As shown in FIG. 3, the melt inlet 27 is in communication with the recess 30 through an inclined channel 32. The projection 29 may be integrated with the wall of the furnace body 50. For example, the projection 29 is made of refractory bricks. It is to be noted that although the channel 32 and the melt inlet 27 are described as two parts here, the channel 32 may be regarded as a part of the melt inlet 27, that is, the entire channel 32 serves as the melt inlet 27 formed in the wall of the furnace body 50. Of course, if the channel 32 and the melt inlet 27 are regarded as separate parts, the melt inlet 27 may be regarded as a lower end opening of the channel 32.

Height of the melt inlet 27 can be lowered by disposing the channel 32 as an inclined channel. The melt inlet 27 can be sealed by means of the melts without additional sealing. In addition, the melts can flow into the furnace body 50 by means of their weight.

In order to discharge small amount of ferrophosphorus from the furnace body 50, the furnace body 50 is further provided with a ferrophosphorus outlet 25 located below the slag outlet. The small amount of ferrophosphorus deposited at a lower portion within the furnace body 50 is discharged through the ferrophosphorus outlet 25 for recovery.

A process of refining phosphorus by the reduction-oxidation furnace 200 according to an embodiment of the present invention will be described briefly below.

First of all, rock phosphate is fed into the melting furnace 100 through the feed port 11 located at the upper portion of the melting furnace 100 while silica flux is also fed into the melting furnace 100 to reduce the melting temperature of the rock phosphate. The rock phosphate and the silica may be fed together or separately. In addition, the rock phosphate and the silica are preheated by the cyclone heater 15 disposed at the feed port 11. Any known cyclone heater may be used as the cyclone heater 15, and the structure of the cyclone heater 15 will not be described in detail anymore.

Then, oxygen and natural gas are injected into the melting furnace 100 through the oxygen and natural gas burner 12. The natural gas is burned to provide heat necessary for melting the rock phosphate.

The rock phosphate begins to melt when the rock phosphate is heated to a temperature of 1450° C. Melting rate of the rock phosphate is speeded up when the rock phosphate is heated to a temperature of more than 1550-1600° C. Fumes generated during the melting of the rock phosphate mainly comprise HF, $SiF_4$, $H_2O$, $CO_2$, CO (small amount), $P_2$ (small amount), and dusts. The fumes are discharged through the feed port 11. Of course, the fumes may be discharged through a special fume outlet additionally disposed at the top of the melting furnace 100.

Melts formed by melting the rock phosphate in the melting furnace 100 are discharged through the melt outlet 14 via the trough 40 into the recess 30. The temperature maintaining nozzle 31 maintains a temperature of the melts within the recess 30. The melts within the recess 30 flow into the furnace body 50 through the inclined channel 32 via the melt inlet 27.

Oxygen and powder coal (or heavy oil) are injected into the furnace body 50 through a side blow gun 26. The powder coal is burned to provide heat necessary for reduction reaction. Moreover, a part of the powder coal services as reducer for reducing phosphorus from the rock phosphate. A formula of reduction reaction performed in the reduction-oxidation furnace 200 (specifically in the furnace body 50) is given by

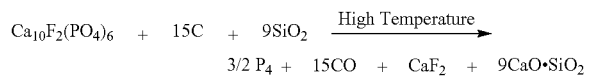

Furthermore, natural gas and air are injected through the top blow gun 21 to a portion located over the surface 28 of the liquid slag within the furnace body 50. The natural gas burns to maintain a temperature of the portion located over the surface 28 of the liquid slag within the furnace body 50, and oxygen of the air reacts with gaseous phosphorus escaping from the melts and the slags to produce phosphorus pentaoxide. Moreover, small amount of CO escaping from the melts and the slags which are generated during the reduction reaction is further oxidized as $CO_2$.

Fumes within the furnace body 50 mainly comprise $P_2O_5$, $CO_2$, CO, and $NO_2$, and are discharged through the fume outlet 22 at the top of the furnace body 50. The phosphorus pentaoxide is separated from the fumes and may be used to produce phosphoric acid.

Melting of the rock phosphate is not performed in the reduction-oxidation furnace 200 anymore, and the melts formed by melting the rock phosphate are directly subjected to reduction and oxidation, compared with prior arts. Therefore, the fumes generated by melting the rock phosphate and the fumes produced by the reduction and oxidization performed in the reduction-oxidation furnace 200 cannot be mixed together and thus the amount of compositions of the fumes containing the phosphorus pentaoxide decreases. As a result, extraction of the phosphorus pentaoxide becomes easy, purity of the phosphorus pentaoxide is increased, and cost is lowered.

Slags generated in the furnace body 50 are discharged through the upper slag outlet 23. When it is necessary to replace the side blow gun 26, the side blow gun 26 can be easily replaced by lowering the surface 28 of the liquid slag within the furnace body 50 below the side blow gun 26 by discharging the slags through the lower slag outlet 24.

Ferrophosphorus may be discharged through the ferrophosphorus outlet 25 when the ferrophosphorus at a bottom of the furnace body 50 reaches a certain amount. The discharged ferrophosphorus is used for recovery.

While the embodiments of the present invention have been shown and described, it will be understood by those skilled in the art that various changes, modifications, substitutions and alterations may be made therein without departing from the principles and spirit of the present invention, the scope of which is defined in the appended claims and their equivalents.

The invention claim is:

1. A reduction-oxidation furnace for thermally refining phosphorus, wherein the reduction-oxidation furnace comprises a furnace body and a blow gun, wherein the furnace body has a slag outlet, a fume outlet, and a melt inlet for feeding melts formed by melting rock phosphate into the furnace body and wherein the blow gun has an end inserted into the furnace body; a projection is disposed on the outer side wall of the furnace body; a recess is disposed on the upper surface of the projection, and the recess is in communication with the melt inlet through an inclined channel.

2. The reduction-oxidation furnace according to claim 1, wherein the blow gun comprises a top blow gun and a side blow gun, the top blow gun has a lower end inserted into the furnace body from the top of the furnace body and always located above the surface of liquid slag within the furnace body, and the side blow gun has an end inserted into the furnace body from a side of the furnace body and located below the melt inlet.

3. The reduction-oxidation furnace according to claim 2, wherein the slag outlet comprises an upper slag outlet and a lower slag outlet located below the upper slag outlet, wherein the lower slag outlet is lower than the end of the side blow gun which is inserted into the furnace body.

4. The reduction-oxidation furnace according to claim 2, wherein a position limiting member is disposed over the furnace body to limit a depth to which the lower end of the top blow gun is inserted into the furnace body.

5. The reduction-oxidation furnace according to claim 1, wherein the melt inlet is located below the surface of the liquid slag within the furnace body.

6. The reduction-oxidation furnace according to claim 1, wherein a temperature maintaining burner is disposed over the recess.

7. The reduction-oxidation furnace according to claim 1, wherein the projection can be integrated with the furnace body.

8. The reduction-oxidation furnace according to claim 7, wherein the projection can be formed of refractory brick to be integrated with the furnace body.

9. The reduction-oxidation furnace according to claim 1, wherein the furnace body further comprises a ferrophosphorus outlet located below the slag outlet.

10. The reduction-oxidation furnace according to claim 1, wherein the melt outlet and the melt inlet can be in communication with each other through a trough or a conduit.

11. The reduction-oxidation furnace according to claim 1, wherein the melt inlet can be located under the melt outlet so that the melts flow directly from the melt outlet to the melt inlet.

\* \* \* \* \*